United States Patent
Meyerhoefer

[19]

[11] Patent Number: 5,892,877
[45] Date of Patent: Apr. 6, 1999

[54] OPTICAL FIBER STRAIN RELIEF SYSTEM

[75] Inventor: Carl E. Meyerhoefer, Commack, N.Y.

[73] Assignee: TII Industries, Inc., Copiague, N.Y.

[21] Appl. No.: 885,225

[22] Filed: Jun. 30, 1997

[51] Int. Cl.⁶ .................................................. G02B 6/00
[52] U.S. Cl. ........................ 385/136; 385/135; 385/137
[58] Field of Search ................................. 385/136, 134, 385/135, 137, 138, 139

[56] References Cited

U.S. PATENT DOCUMENTS

| | | |
|---|---|---|
| 4,171,867 | 10/1979 | Cocito . |
| 4,254,865 | 3/1981 | Pacey et al. . |
| 4,266,853 | 5/1981 | Hutchins et al. . |
| 4,319,802 | 3/1982 | Bowes ..................................... 385/135 |
| 4,489,830 | 12/1984 | Charlebois et al. . |
| 4,502,754 | 3/1985 | Kawa . |
| 4,518,817 | 5/1985 | Kirby et al. . |
| 4,595,255 | 6/1986 | Bhatt et al. . |
| 4,627,686 | 12/1986 | Szentesi . |
| 4,717,231 | 1/1988 | Dewez et al. . |
| 4,778,242 | 10/1988 | Ota et al. . |
| 4,846,545 | 7/1989 | Estabrook et al. . |
| 4,846,565 | 7/1989 | Swanson et al. . |
| 4,863,234 | 9/1989 | Gladenbeck et al. . |
| 5,029,958 | 7/1991 | Hodge et al. . |
| 5,067,784 | 11/1991 | Debortoli et al. ........................ 385/53 |
| 5,074,635 | 12/1991 | Justice et al. .............................. 385/95 |
| 5,119,459 | 6/1992 | Meyerhoefer et al. ................. 385/135 |
| 5,241,617 | 8/1993 | Peacock et al. ......................... 385/135 |
| 5,274,731 | 12/1993 | White ...................................... 385/135 |
| 5,278,933 | 1/1994 | Hunsinger et al. ..................... 385/135 |
| 5,287,428 | 2/1994 | Shibata .................................... 385/135 |
| 5,353,367 | 10/1994 | Czosnowski et al. .................. 385/135 |
| 5,355,429 | 10/1994 | Lee et al. ................................ 385/136 |
| 5,367,591 | 11/1994 | Seike et al. ............................... 385/51 |
| 5,367,598 | 11/1994 | Devenish, III et al. ................ 385/135 |
| 5,375,185 | 12/1994 | Hermsen et al. ....................... 385/135 |
| 5,428,705 | 6/1995 | Hermsen et al. ....................... 385/135 |
| 5,471,555 | 11/1995 | Braga et al. ............................ 385/136 |

FOREIGN PATENT DOCUMENTS

| | | |
|---|---|---|
| 58-93020 | 6/1983 | Japan . |
| 62-21107 | 1/1987 | Japan . |

OTHER PUBLICATIONS

SIECOR, Fiber Distribution Center Product Family, pp. 5–37; 5–41, no month no year.

Lightguide Shelf Combination (LSC), AT&T Fiber Optic Products, Feb. 1995, pp. 8A–27; 8A–28.

TII–DITEL, 288 OSC Optical Splice Closure, pp. 1–4, no month, no year.

Primary Examiner—Phan T. H. Palmer
Attorney, Agent, or Firm—Morgan & Finnegan, L.L.P.

[57] ABSTRACT

The invention provides for an optical fiber strain relief system and a method for using the same. The optical fiber strain relief system includes a tab, a mass fusion splice protection sleeve and a tray for securing the tab and sleeve. The tab has substantially rectangular members, having long dimensions extending in the direction of fiber optic ribbon cables. The substantially rectangular members have widened portions and are joined at the widened portions by a short member. The substantially rectangular members of the tab fold over fiber optic ribbon cables, bending the short adjoining member, and thereby attaching to the fiber optic ribbon cables. Once attached to the fiber optic ribbon cables, the tab protects the optical fibers from bending and tensile forces and provides strain relief. The tray has retainers for securing the tabs and mass fusion splice protection sleeves to further protect the optical fibers and provide strain relief. The tray is fitted with a cover.

13 Claims, 5 Drawing Sheets

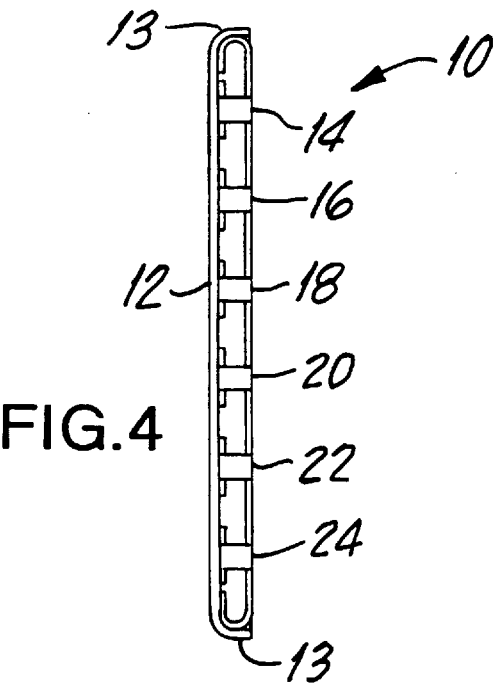
FIG.4
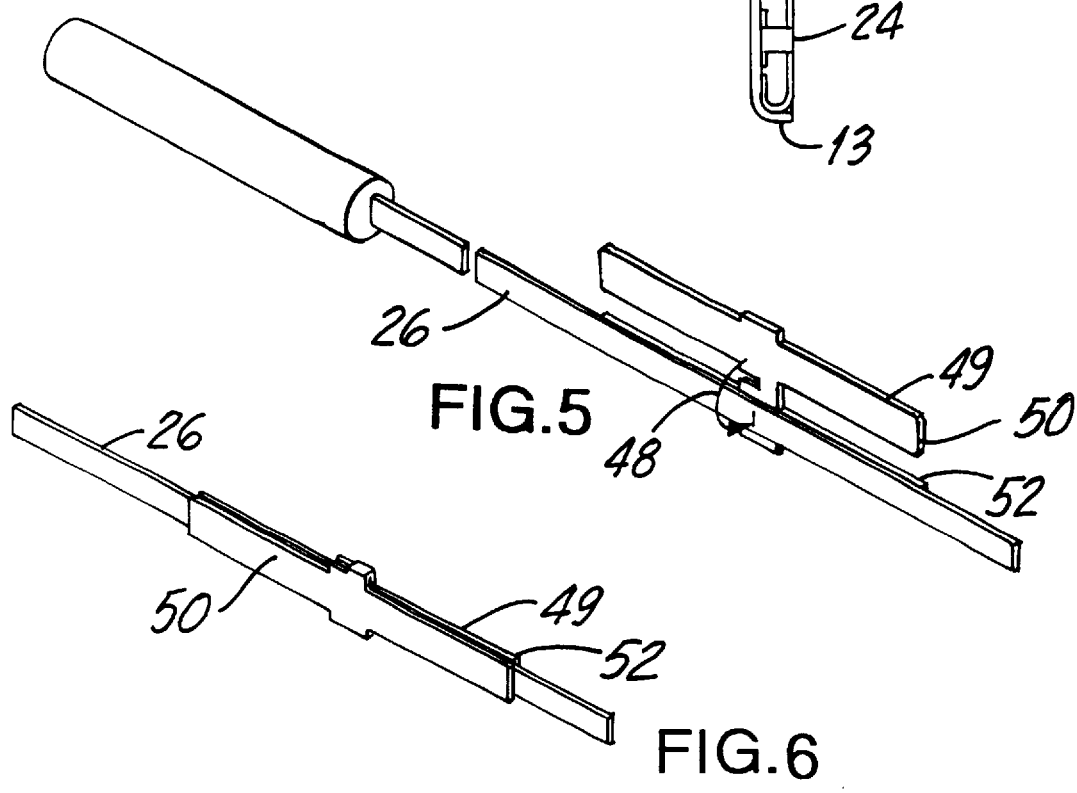
FIG.5
FIG.6
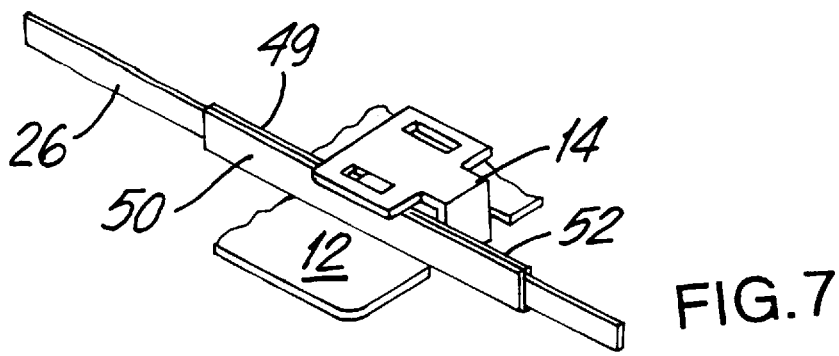
FIG.7

OPTICAL FIBER STRAIN RELIEF SYSTEM

TECHNICAL FIELD

The invention is related to an optical fiber strain relief system and, in particular, an apparatus for providing strain relief for mass fusion spliced fiber optic ribbon cables and a method of using the same.

BACKGROUND OF THE INVENTION

Optical fiber communications systems are extensively used in the telecommunications industry due to large information carrying capacity, virtually noise-free performance and long span distances achievable before regeneration and amplification of the signal is required. In any communication system employing optical fibers, termination points for optical fiber cross connections, interconnections and terminations are required.

At the termination points, optical fibers are spliced and secured once spliced, for example, as shown in U.S. Pat. No. 4,627,686 to Szentesi dated Dec. 9, 1986, U.S. Pat. No. 4,171,867 to Cocito dated Oct. 23, 1979, U.S. Pat. No. 4,266,853 to Hutchins et al. dated May 12, 1981 and U.S. Pat. No. 4,489,830 to Charlebois et al. dated Dec. 25, 1984. Fusion splicing of optical fibers entails remelting of the optical fiber material at the ends of the optical fibers to be spliced and joining the ends while molten in a precise controlled manner. Fusion splicing provides for minimal attenuation (power loss) and back reflection during use of the fused optical fiber, normally less than that of mechanically spliced optical fibers.

Optical fiber strain relief devices and systems also may be provided to protect spliced fibers, as shown, for example in U.S. Pat. No. 5,375,185 to Hermsen et al dated Dec. 20, 1994, U.S. Pat. No. 5,471,555 to Braga et al dated Nov. 28, 1995, U.S. Pat. No. 5,428,705 to Hermsen et al dated Jun. 27, 1995, U.S. Pat. No. 5,074,635 to Justice et al dated Dec. 24, 1991, U.S. Pat. No. 5,367,591 to Seike et al. dated Nov. 22, 1994, U.S. Pat. No. 4,863,234 to Gladenbeck et al. dated Sep. 5, 1989, U.S. Pat. No. 4,846,545 to Estabrook et al. dated Jul. 11, 1989, U.S. Pat. No. 4,778,242 to Ota et al. dated Oct. 18, 1988, U.S. Pat. No. 4,254,865 to Pacey et al. dated Mar. 10, 1981, U.S. Pat. No. 4,319,802 to Bowes dated Mar. 16, 1982, U.S. Pat. No. 5,355,429 to Lee et al dated Oct. 11, 1994, Japanese Patent No. 58-93020 dated Jun. 2, 1983 and Japanese Patent No. 62-21107 dated Jan. 29, 1987.

Known optical fiber strain relief systems have shortcomings. For example, some optical fiber strain relief systems have the disadvantage of securing individually spliced optical fiber and not accommodating mass fusion spliced fiber optic ribbon cables. Other optical fiber strain relief systems have the disadvantage of requiring considerable effort and specialized skill to manipulate and use. Finally, still other optical fiber strain relief systems require specialized optical fiber storage and splicing enclosures or specialized manufacturing. Thus, there is a need in the art for a optical fiber strain relief system for securing, protecting and providing strain relief for mass fusion spliced fiber optic cables that is economical, easy to use and efficient.

SUMMARY OF THE INVENTION

The invention provides for an optical fiber strain relief system for providing strain relief for mass fusion spliced fiber optic ribbon cables and a method for using the same.

The optical fiber strain relief system includes a tray, tabs for receiving and providing strain relief for fiber optic ribbon cables, retainers for securing the tabs to the tray, mass fusion splice protective sleeves for receiving and providing strain relief for mass fusion spliced fiber optic ribbon cables, retainers for securing the mass fusion splice protection sleeves to the tray and a cover. The tray provides support for the retainers that accept the tabs, the retainers that accept the mass fusion splice protection sleeves and any excess lengths of fiber optic ribbon cable. The tabs have substantially rectangular members, having long dimensions extending in the direction of fiber optic ribbon cables. The tabs have widened portions and are joined at the widened portions by a short member. The substantially rectangular members of the retainers fold over fiber optic ribbon cables, bending the short adjoining member, and thereby attaching to the optical fiber ribbons. Once attached to the fiber optic ribbon cables, the tabs are secured to the tray by retainers at the edges of the tray to provide strain relief for the cables entering and exiting the tray, protecting against bending and tensile forces. The mass fusion splice protection sleeve provides strain relief for fiber optic ribbon cables at their termination point.

Thus, as will be fully appreciated from the description of the preferred embodiments set forth below, an optical fiber strain relief system and method for using the same in accordance with the invention provides for an economical, easy to use and efficient means for providing strain relief for mass fusion spliced fiber optic ribbon cables.

BRIEF DESCRIPTION OF THE DRAWINGS

FIG. 4 is a side view of an optical fiber strain relief system in accordance with the invention.

FIG. 5 is a perspective view of a tab of the optical fiber strain relief system in accordance with the invention in an open position.

FIG. 6 is a perspective view of a tab of the optical fiber strain relief system in accordance with the invention in a closed position.

FIG. 7 is a perspective view of a tab of the optical fiber strain relief system in accordance with the invention in a closed position and secured to a tray of the optical fiber strain relief system in accordance with the invention.

DETAILED DESCRIPTION OF PREFERRED EMBODIMENTS

Figure 1:
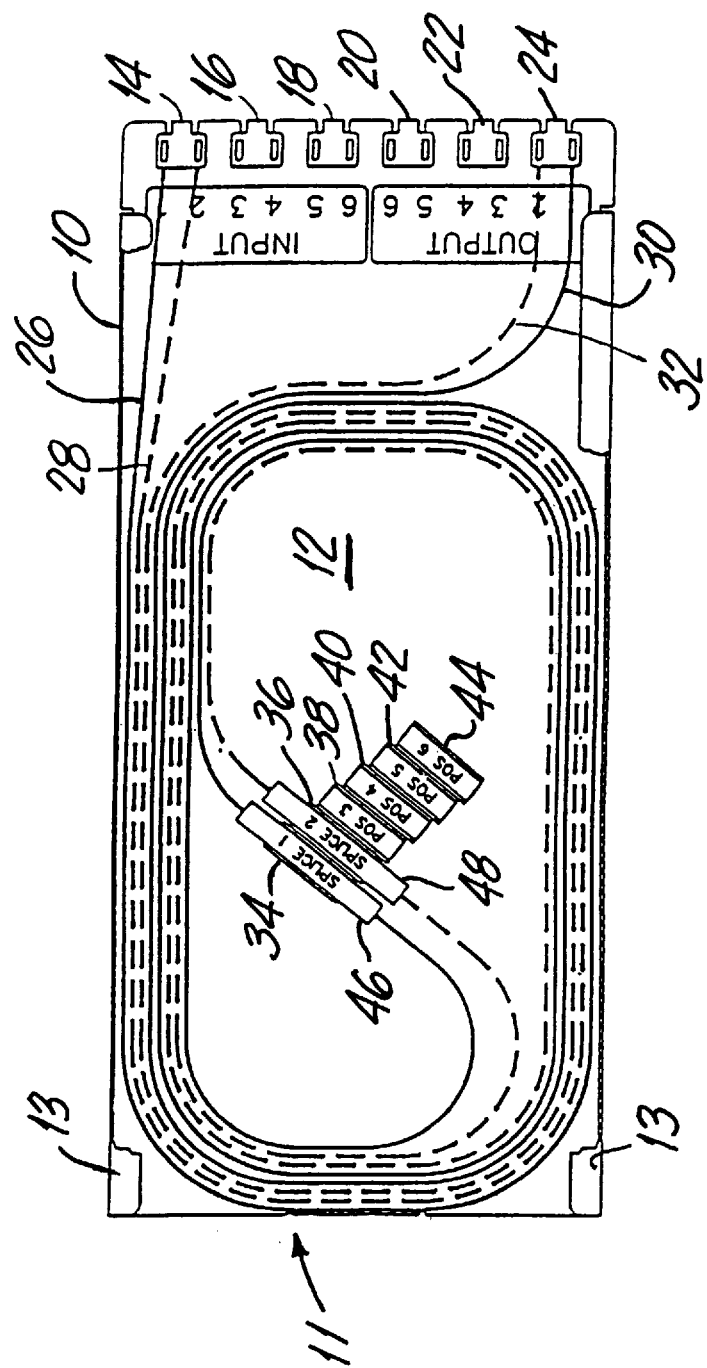
FIG. 1 is a front view of an optical fiber strain relief system in accordance with the invention.

Referring to FIGS. 1–4, there are shown preferred embodiments of an optical fiber strain relief system in accordance with the invention. The optical fiber strain relief system includes a tray 10 having a base 12, retainers 14, 16 and 18 at an edge of the base 12 for securing six incoming fiber optic ribbon cables (e.g., 26 and 28), retainers 20, 22 and 24 at the edge of the base 12 for securing six outgoing fiber optic ribbon cables (e.g., 30 and 32), and retainers 34, 36, 38, 40, 42 and 44 centrally located on the base 12 for securing six mass fusion splice protection sleeves (e.g., 46 and 48), which are attached to the six incoming fiber optic ribbon cables (e.g., 26 and 28) and the six outgoing optical fiber ribbon cables (e.g., 30 and 32) at the location where the ribbon cables are spliced together.

Figure 2:
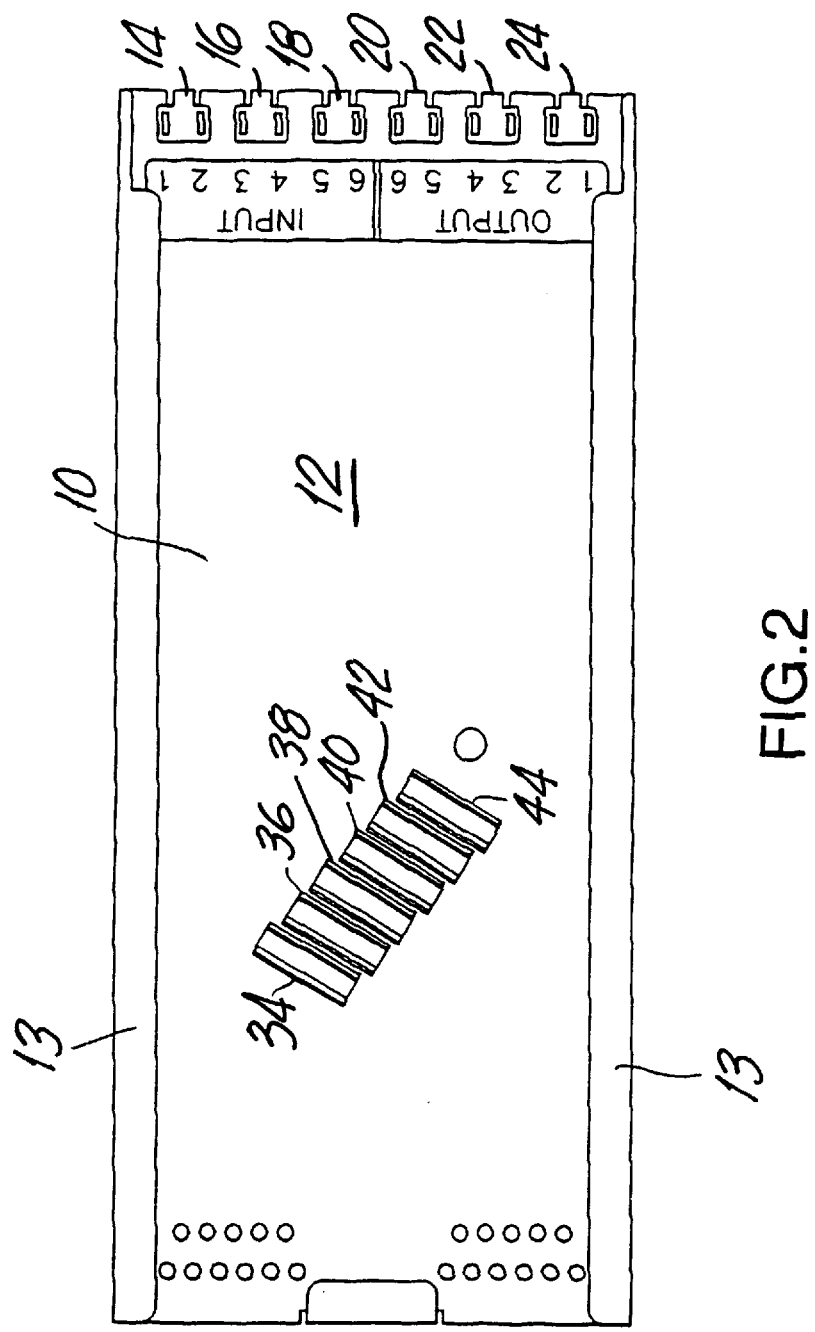
FIG. 2 is a front view of an optical fiber strain relief system in accordance with the invention.

In the embodiment of the optical fiber strain relief system in accordance with the invention shown in FIGS. 1 and 2, incoming fiber optic ribbon cables 26 and 28 are secured at the edge of base 12 of tray 10 by tab 49 (shown in FIGS. 5–9) and retainer 14, are looped around the periphery of the base 12 of tray 10 in a counterclockwise fashion as generally shown at 11, and terminate at splices within the mass fusion splice protection sleeves 46 and 48. Outgoing fiber optic ribbon cables 30 and 32 terminate at splices within the mass fusion splice protection sleeves 46 and 48, are looped around the periphery of the base 12 of tray 10 in a clockwise fashion as generally shown at 11, and are secured at the edge of tray 10 by tab 49 and retainer 24. The mass fusion splice protection sleeves 46 and 48, and thus the spliced fiber optic ribbon cables 26, 28, 30 and 32 within those sleeves, are secured to the base 12 of tray 10 by retainers 34 and 36.

Figure 3:
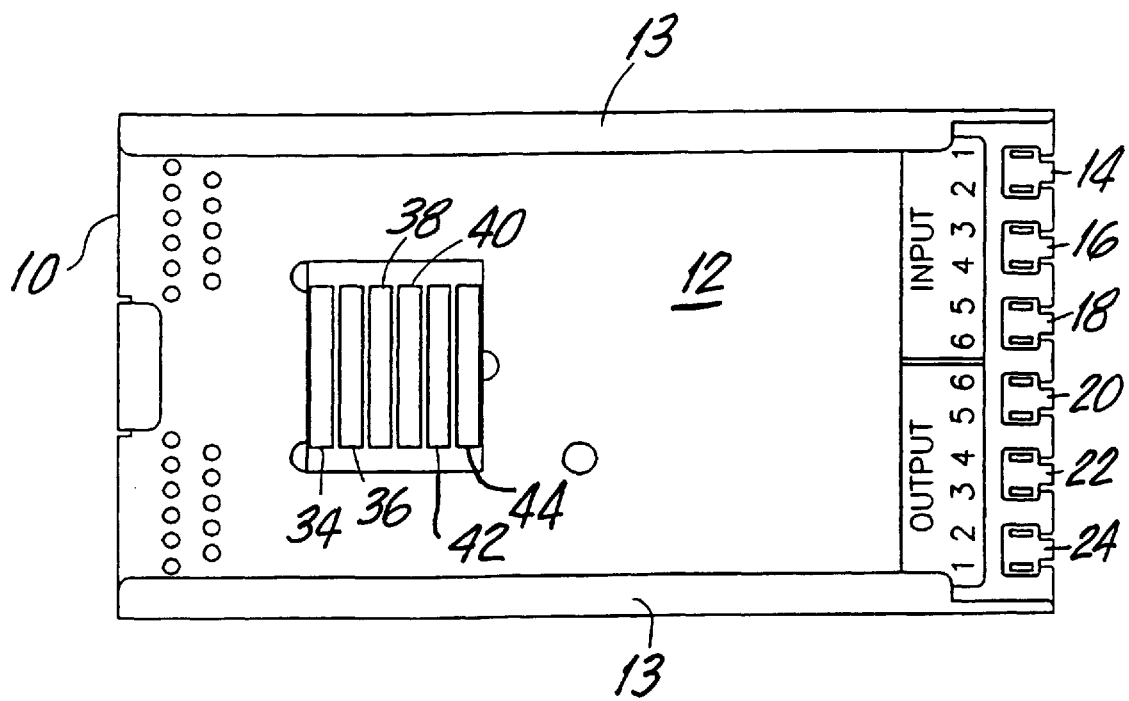
FIG. 3 is a front view of an optical fiber strain relief system in accordance with the invention.

In a preferred embodiment of the optical fiber strain relief system in accordance with the invention, the tray shown in FIGS. 1 and 2 is 11.13 inches in length, 5.11 inches in width and 0.31 inches in depth (including a cover); the tray shown in FIG. 3 is 8.75 inches in length, 5.11 inches in width and 0.31 inches in depth (including the cover); and the tray is constructed of light weight aluminum.

Tray 10 has side walls 13 projecting from base 12. Side walls 13 cooperate to retain excess lengths of fiber optic ribbon cables in tray 10. Excess lengths of fiber optic ribbon cables may also be retained on the base 12 of tray 10 by any suitable means. In the embodiment of the optical fiber strain relief system in accordance with the invention shown in FIG. 3, the incoming and outgoing fiber optic ribbon cables meet at mass fusion splice protection sleeves retained in retainers 34, 36, 38, 40, 42 and 44 forming a pear shape (not shown) so that no excess lengths of fiber optic ribbon cable are retained in base 12 of tray 10.

Tray 10 may be formed to accept a cover (not shown). Such a cover can be attached to the side walls 13 of tray 12 or around the periphery of the base 12 of tray 10 by any suitable means to completely enclose and thereby further protect the fiber optic ribbon cables and splices. In a preferred embodiment the optical fiber strain relief system in accordance with the invention, the cover is made of a transparent plastic material.

A preferred embodiment of the mass fusion splice protection sleeves 46 and 48 is described in copending U.S. patent application Ser. No. 08/796,926, filed, Feb. 7, 1997 now U.S. Pat. No. 5,832,162, which is incorporated herein by reference.

Figure 8:
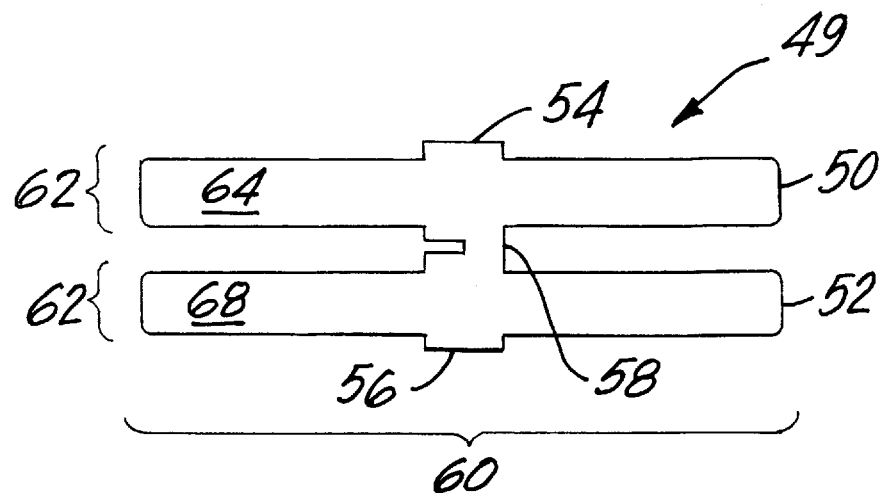
FIG. 8 is a plan view of a tab of the optical fiber strain relief system in accordance with the invention.
Figure 9:
FIG. 9 is a side view of a tab of the optical fiber strain relief system in accordance with the invention.

FIGS. 5–9 depict a preferred embodiment of the tab 49 of the optical fiber strain relief system in accordance with the invention and the use of the same. FIGS. 5–7 are perspective views of the tab 49 of the optical fiber strain relief system in accordance with the invention. FIG. 8 is a plan view of the tab 49 of the optical fiber strain relief system in accordance with the invention. FIG. 9 is a side view of the tab 49 of the optical fiber strain relief system in accordance with the invention.

Referring to FIGS. 5–9, the tab 49 is attached to optical fiber ribbon cable 26. The tab 49 is a thin sheet of suitable material as shown in FIG. 9 having substantially rectangular members 50 and 52 as most clearly shown FIG. 8. Members 50 and 52 have dimensions 60 and 62. Dimension 60 of members 50 and 52 is parallel to the direction of the fiber optic ribbon cable. Dimension 62 of members 50 and 52 is transverse to the direction of the fiber optic ribbon cable. Dimension 60 of members 50 and 52 is the long dimension of the rectangle and dimension 62 is short dimension of the rectangle. In a preferred embodiment of the tab 49 of the optical fiber strain relief system in accordance with the invention, the long dimension 60 of members 50 and 52 is 1.5 inches or approximately 9 times longer than the short dimension 62 of 0.165 inches.

Members 50 and 52 have centrally located portions 54 and 56 that are slightly wider than the short dimension 62 of the members. In the preferred embodiment of the tab 49 of the optical fiber strain relief system in accordance with the invention, portions 54 and 56 are 0.175 inches long (i.e., the direction parallel to the long direction of members 50 and 52) and 0.240 inches wide, extending approximately 0.04 inches from either side of members 50 and 52.

Members 50 and 52 are joined at portions 54 and 56 by a short member 58. Member 58 is narrower than the full length of portions 54 and 56 of members 50 and 52. In the preferred embodiment of the tab 49 of the optical fiber strain relief system in accordance with the invention, member 58 is 0.088 inches long (i.e., the direction parallel to the long dimension of members 50 and 52) and 0.03 inches wide.

The tabs 49 are secured to the fiber optic ribbon cables (e.g., 26) in the vicinity of the entry or exit point of the fiber optic ribbon cables of the tray 10. Specifically, member 52 of tab 46 abuts fiber optic ribbon cable 26 in the vicinity of the entry or exit point of the fiber optic ribbon cable 26 of the tray 10 as shown in FIG. 5. Member 50 is then folded in the direction of arrow 48 in FIG. 5, bending member 58, until member 50 rests on fiber optic ribbon cable 26 as shown in FIG. 6. In this position, the tab 49 of the optical fiber strain relief system protects the fiber optic ribbon cable 26 from bending or tensile forces and thereby provides strain relief. The tab 49 of the optical fiber strain relief system is then secured in retainer 14 on the base 12 of tray 10 as shown in FIG. 7. The tab 49 protects the fiber optic ribbon cable 26 at the point where it enters the tray 10 and provides strain relief by absorbing tensile and bending forces exerted on cable 26. Finally, any excess length of fiber optic ribbon cable 26 maybe routed on the base 12 of tray 10 and, if desired, secured to the base 12. Subsequently spliced fiber optic ribbon cables are routed using ribbon cable 26 as a guide.

Tab 49 and retainer 14 cooperate to retain fiber optic ribbon cable 26 such that the fiber optic ribbon cable stands on one of its sides in the tray 10 as shown in FIG. 7. This facilitates management of the fiber optic ribbon cable in the tray 10, i.e. because the fiber optic ribbon cable 26 is on one side, the fiber optic ribbon cable can be readily looped around the periphery of base 12 of tray 10.

To provide strain relief, the optical fiber strain relief system, including the tray 10, retainers 14, 16, 18, 20, 22 and 24, retainers 34, 36, 38, 40, 42 and 44, tab 49, mass fusion splice protection sleeves 46 and 48 and cover in accordance with the invention must be strong enough to protect, provide rigid support to fiber optic ribbon cables and prevent bending or tension thereof. Constructing the optical fiber strain relief system of sufficient strength would be apparent to persons skilled in the art. In a preferred embodiment of the optical fiber strain relief system in accordance with the invention, the tab is made of Mylar® having a thickness of 0.01 inch.

The tab 49 of the optical fiber strain relief system may have pressure sensitive adhesive on faces 64 and 68 of members 50 and 52 that contact the fiber optic ribbon cables.

In a preferred embodiment of the tab 49 of the optical fiber strain relief system, 3M Corporation 927 adhesive is placed on the face 64 of member 52 so that face 64 of tab 49 of the optical fiber strain relief system adheres to ribbon 26 upon abutting the ribbon.

The optical fiber strain relief system in accordance with the invention is made of suitable dimensions and materials to fulfill its intended purpose. Exemplary dimensions and materials of preferred embodiments of the optical fiber strain relief system in accordance with the invention are set forth above. Other dimensions and materials for the optical fiber strain relief system adequate to provide strain relief and support would be apparent to persons skilled in the art.

It will appreciated by persons skilled in the art that herein described is an improved optical fiber strain relief device, system and method of use. While the present invention has been described by reference to various preferred embodiments, it will be understood by persons skilled in the art that many modifications and variations may be made in those preferred embodiments without departing from the spirit and scope of the invention not be limited to the disclosed preferred embodiments and that it have the full scope permitted by the following claims.

I claim:

1. A tab for use in an optical fiber strain relief system comprising:
   elongated members;
   a short member between the elongated members and adjoining the elongated members;
   the short member capable of being deformed so that the elongated members can be folded together over a fiber optic ribbon cable about an axis parallel to optical fibers contained within the fiber optic ribbon cable.

2. The tab system of claim 1 wherein the elongated members are substantially rectangular and have a length in the direction of the fiber optic ribbon cable approximately equal to nine times its width.

3. The tab of claim 2 wherein each elongated member has a portion of increased width.

4. The tab of claim 2 wherein the elongated members are thin sheets of material having adhesive material on faces thereof.

5. An optical fiber strain relief system, comprising:
   a tab having elongated members, a short member between the elongated members and adjoining the elongated members, the short member capable of being deformed so that the elongated members can be folded together over an fiber optic ribbon cable about an axis parallel to optical fibers contained within the fiber optic ribbon cable;
   a tray having a base;
   mass fusion splice protection sleeves; and
   retainers on the base for securing the tabs and mass fusion splice protection sleeves, the tabs and mass fusion splice protection sleeves providing strain relief for the fiber optic ribbon cable.

6. The optical fiber strain relief system of claim 5 wherein the elongated members of the tabs are substantially rectangular and have a length in the direction of the fiber optic ribbon cables approximately equal to nine times its width.

7. The optical fiber strain relief system of claim 6 wherein the retainers on the base for retaining the tabs are located at an edge of the base, the tabs securing and providing strain relief for incoming and outgoing fiber optic ribbon cables.

8. The optical fiber strain relief system of claim 7 further comprising a cover attached to the base.

9. The optical fiber strain relief system of claim 6 wherein each elongated member has a portion of increased width.

10. The optical fiber strain relief system of claim 6 wherein the elongated members are thin sheets of material having adhesive material on faces thereof.

11. A method for providing strain relief for optical fibers comprising:
    attaching a tab to a fiber optic ribbon cable by folding elongated members adjoined by a short member over the fiber optic ribbon cable about an axis parallel to optical fibers contained within the fiber optic ribbon cable such that the short member is deformed;
    securing the tab to a tray;
    splicing optical fibers contained within the fiber optic ribbon cable using a mass fusion splice protection sleeve;
    securing the mass fusion splice protection sleeve to the tray;
    such that the cooperation of the tab, tray and mass fusion splice protection sleeve provide strain relief for the fiber optic ribbon cable.

12. The method for providing strain relief for optical fibers of claim 11 further comprising attaching a cover to the base.

13. The method for providing strain relief for optical fibers of claim 11 further comprising looping excess lengths of fiber optic ribbon cable about the tray.

* * * * *